US011836855B2

(12) United States Patent
Pestov

(10) Patent No.: US 11,836,855 B2
(45) Date of Patent: Dec. 5, 2023

(54) SYSTEM AND METHOD FOR HARMONIZATION OF VERTICAL PROJECTIONS FOR DISPLAYING OF GEOSPATIAL OBJECT DATA IN MEDIATED REALITY

(71) Applicant: VGIS INC., Toronto (CA)

(72) Inventor: Alexandre Pestov, Toronto (CA)

( * ) Notice: Subject to any disclaimer, the term of this patent is extended or adjusted under 35 U.S.C. 154(b) by 267 days.

(21) Appl. No.: 17/497,377

(22) Filed: Oct. 8, 2021

(65) Prior Publication Data

US 2023/0110052 A1    Apr. 13, 2023

(51) Int. Cl.
*G06T 17/05* (2011.01)
*G06T 19/00* (2011.01)

(52) U.S. Cl.
CPC ............ *G06T 17/05* (2013.01); *G06T 19/006* (2013.01); *G06T 2219/008* (2013.01)

(58) Field of Classification Search
None
See application file for complete search history.

(56) References Cited

U.S. PATENT DOCUMENTS

| 10,152,665 | B2 | 12/2018 | Ardö et al. |
| 10,311,643 | B2 | 6/2019 | Daniels et al. |
| 10,373,035 | B2 | 8/2019 | Skans et al. |
| 10,559,136 | B2 | 2/2020 | Daniels et al. |
| 10,964,116 | B2 | 3/2021 | Daniels et al. |
| 11,354,870 | B2 | 6/2022 | Daniels et al. |
| 2016/0343137 | A1 | 11/2016 | Skans et al. |
| 2017/0323187 | A1 | 11/2017 | Ardö et al. |
| 2018/0005450 | A1 | 1/2018 | Daniels et al. |
| 2019/0304199 | A1 | 10/2019 | Daniels et al. |
| 2020/0098189 | A1* | 3/2020 | Pavloff ................. G06T 19/006 |
| 2020/0273256 | A1 | 8/2020 | Daniels et al. |
| 2021/0056760 | A1* | 2/2021 | Cowburn ................ G06T 19/20 |

(Continued)

FOREIGN PATENT DOCUMENTS

| CN | 106169184 A | 11/2016 |
| CN | 107346406 A | 11/2017 |
| CN | 107346406 B | 4/2019 |

(Continued)

*Primary Examiner* — Yi Wang
(74) *Attorney, Agent, or Firm* — Bhole IP Law; Anil Bhole; Marc Lampert

(57) ABSTRACT

A system and method for harmonization of vertical projections for displaying of geospatial object data on a mediated reality (MR) device. The method includes: determining an absolute elevation of the MR device relative to a fixed elevation reference; determining an elevation of the MR device relative to physical ground; determining a projection plane using the elevation of the MR device; determining positioning of the projection plane relative to the fixed elevation reference; determining positioning of the geospatial objects with relative vertical positioning data in the mediated reality display relative to the determined projection plane; determining positioning of the geospatial objects with absolute vertical positioning data in the mediated reality display relative to the fixed elevation reference; and outputting the positioned geospatial objects with relative vertical positioning data and the positioned geospatial objects with absolute vertical positioning data to the display of the MR device.

20 Claims, 12 Drawing Sheets

(56) References Cited

U.S. PATENT DOCUMENTS

2021/0264675 A1    8/2021  Daniels et al.

FOREIGN PATENT DOCUMENTS

| | | |
|---|---|---|
| EP | 3096290 A1 | 11/2016 |
| EP | 3242245 A1 | 11/2017 |
| EP | 3242245 B1 | 6/2018 |
| JP | 2017021328 A | 1/2017 |
| JP | 2017224282 A | 12/2017 |
| JP | 6473475 B2 | 2/2019 |
| JP | 6484587 B2 | 2/2019 |
| KR | 20160136233 A | 11/2016 |
| KR | 20170125726 A | 11/2017 |
| KR | 20180081028 A | 7/2018 |
| KR | 101913371 B1 | 10/2018 |
| KR | 102019412 B1 | 9/2019 |
| TW | 201710997 A | 3/2017 |
| TW | 201741934 A | 12/2017 |
| TW | I657377 B | 4/2019 |
| WO | 2016077506 A1 | 5/2016 |
| WO | 2016077506 A8 | 5/2017 |

\* cited by examiner

DTM corrections disabled      DTM corrections enabled

SYSTEM AND METHOD FOR HARMONIZATION OF VERTICAL PROJECTIONS FOR DISPLAYING OF GEOSPATIAL OBJECT DATA IN MEDIATED REALITY

TECHNICAL FIELD

The following relates generally to geospatial object display; and more particularly, to systems and methods for harmonization of vertical projections for displaying of geospatial object data in mediated reality.

BACKGROUND

Surveying firms, mapping firms, municipalities, public utilities, and many other entities, collect, store, use, and disseminate vast amounts of geospatial object data. This geospatial object data can be used to manage daily operations and conduct mission-critical tasks; for example, asset maintenance, construction plan design, zoning proposals, among many others. Traditionally, geospatial object data is collected using manual measurements (offsets) from detectable local landscape features; for example, a curb line. Then the collected measurements would be plotted on a map to indicate object/asset locations. The maps could then be reprinted for use in the field. While much of this geospatial object data can be digitized, the accuracy and quality of such digital representations may affect the tasks and applications that rely on such data. In other approaches, location tools, such as global navigation satellite systems (GNSS) and/or real-time kinematic (RTK), can be used to collect digital geospatial object data. These approaches generally require cumbersome, unsophisticated, and time-consuming validation techniques.

Mediated reality (MR) systems, including augmented reality (AR), mixed reality, and virtual reality (VR), provide interactive experiences with a real-world and/or virtual world environment. In such cases, objects that reside in the real world can be augmented or represented by computer-generated perceptual information. As an application of such mediated reality systems, the above geospatial object data can be augmented or represented to a user in comparison to real-world object/asset locations. However, often the location of such digital representations may be inaccurate.

SUMMARY

In an aspect, there is provided a computer-executable method for harmonization of vertical projections for displaying of geospatial object data on a mediated reality (MR) device, the geospatial object data comprising geospatial objects with relative vertical positioning data that is relative to other geospatial objects and geospatial objects with absolute vertical positioning data that is relative to a fixed elevation reference, the method comprising: receiving the geospatial object data; determining an absolute elevation of the MR device relative to a fixed elevation reference; determining an elevation of the MR device relative to physical ground that is in proximity to the MR device; determining a projection plane using the determined elevation of the MR device; determining positioning of the projection plane relative to the fixed elevation reference; determining positioning of the geospatial objects with relative vertical positioning data in the mediated reality display relative to the determined projection plane; determining positioning of the geospatial objects with absolute vertical positioning data in the mediated reality display relative to a fixed elevation reference; and outputting the positioned geospatial objects with relative vertical positioning data and the positioned geospatial objects with absolute vertical positioning data to the display of the MR device.

In a particular case of the method, the method further comprising receiving a digital terrain model, and wherein determining the projection plane comprises using the surface of the digital terrain model in the determination of the projection plane.

In another case of the method, determining the elevation of the MR device relative to the physical ground comprises either performing surface scanning or using a predefined value.

In yet another case of the method, if the elevation of the digital terrain model is not available, using a predefined value as the elevation of the projection plane.

In yet another case of the method, determining the projection plane comprises coinciding the projection plane with a flat plane at the physical ground surface in proximity to a location of determined elevation of the MR device.

In yet another case of the method, the absolute elevation associated with the MR device is determined using at least one of global navigation satellite systems (GNSS), real-time kinematic (RTK), and a surveying instrument.

In yet another case of the method, the absolute elevation associated with the MR device is determined using an absolute elevation of the digital terrain model in addition to the elevation of the MR device relative to physical ground.

In yet another case of the method, determining the elevation of the MR device relative to physical ground that is in proximity to the MR device is performed periodically or intermittently.

In yet another case of the method, the digital terrain model comprises a predetermined offset to shift the digital terrain model vertically upwards or downwards to align the digital terrain model elevation with the physical ground elevation.

In yet another case of the method, the method further comprising displaying a projection of at least one of the geospatial objects onto the digital terrain model on the display of the MR device.

In another aspect, there is provided a system for harmonization of vertical projections for displaying of geospatial object data on a mediated reality (MR) device, the geospatial object data comprising geospatial objects with relative vertical positioning data and geospatial objects with absolute vertical positioning data, the system comprising one or more processors in communication with a data storage to execute: an input module to receive the geospatial object data; an elevation module to determine an absolute elevation of the MR device relative to a fixed elevation reference and to determine an elevation of the MR device relative to physical ground that is in proximity to the MR device and determine a projection plane using the determined elevation of the MR device; a harmonization module to determine positioning of the projection plane relative to the fixed elevation reference; a placement module to positioning of the geospatial objects with relative vertical positioning data in the mediated reality display relative to the determined projection plane and determine positioning of the geospatial objects with absolute vertical positioning data in the mediated reality display relative to the fixed elevation reference; and an output device to output the positioned geospatial objects with relative vertical positioning data and the positioned geospatial objects with absolute vertical positioning data to the display of the MR device.

In a particular case of the system, the input module further receives a digital terrain model, and wherein determining the projection plane comprises using the surface of the digital terrain model in the determination of the projection plane.

In another case of the system, determining the elevation of the MR device relative to the physical ground comprises either performing surface scanning or using a predefined value.

In yet another case of the system, if the elevation of the digital terrain model is not available, using a predefined value as the elevation of the projection plane.

In yet another case of the system, the projection plane coincides with a flat plane at the physical ground surface in proximity to the MR device.

In yet another case of the system, the absolute elevation associated with the MR device is determined using at least one of global navigation satellite systems (GNSS), real-time kinematic (RTK), and a surveying instrument.

In yet another case of the system, the absolute elevation associated with the MR device is determined using an absolute elevation of the digital terrain model in addition to the elevation of the MR device relative to physical ground.

In yet another case of the system, determining the elevation of the MR device relative to physical ground that is in proximity to the MR device is performed periodically or intermittently.

In yet another case of the system, the digital terrain model comprises a predetermined offset to shift the digital terrain model vertically upwards or downwards to align the digital terrain model elevation with the physical ground elevation.

In yet another case of the system, the system further comprising a projection module to determine a projection of at least one of the geospatial objects onto the digital terrain model to be displayed on the display of the MR device.

These and other aspects are contemplated and described herein. It will be appreciated that the foregoing summary sets out representative aspects of the system and method to assist skilled readers in understanding the following detailed description.

BRIEF DESCRIPTION OF THE DRAWINGS

A greater understanding of the embodiments will be had with reference to the figures, in which.

DETAILED DESCRIPTION

Figure 1:
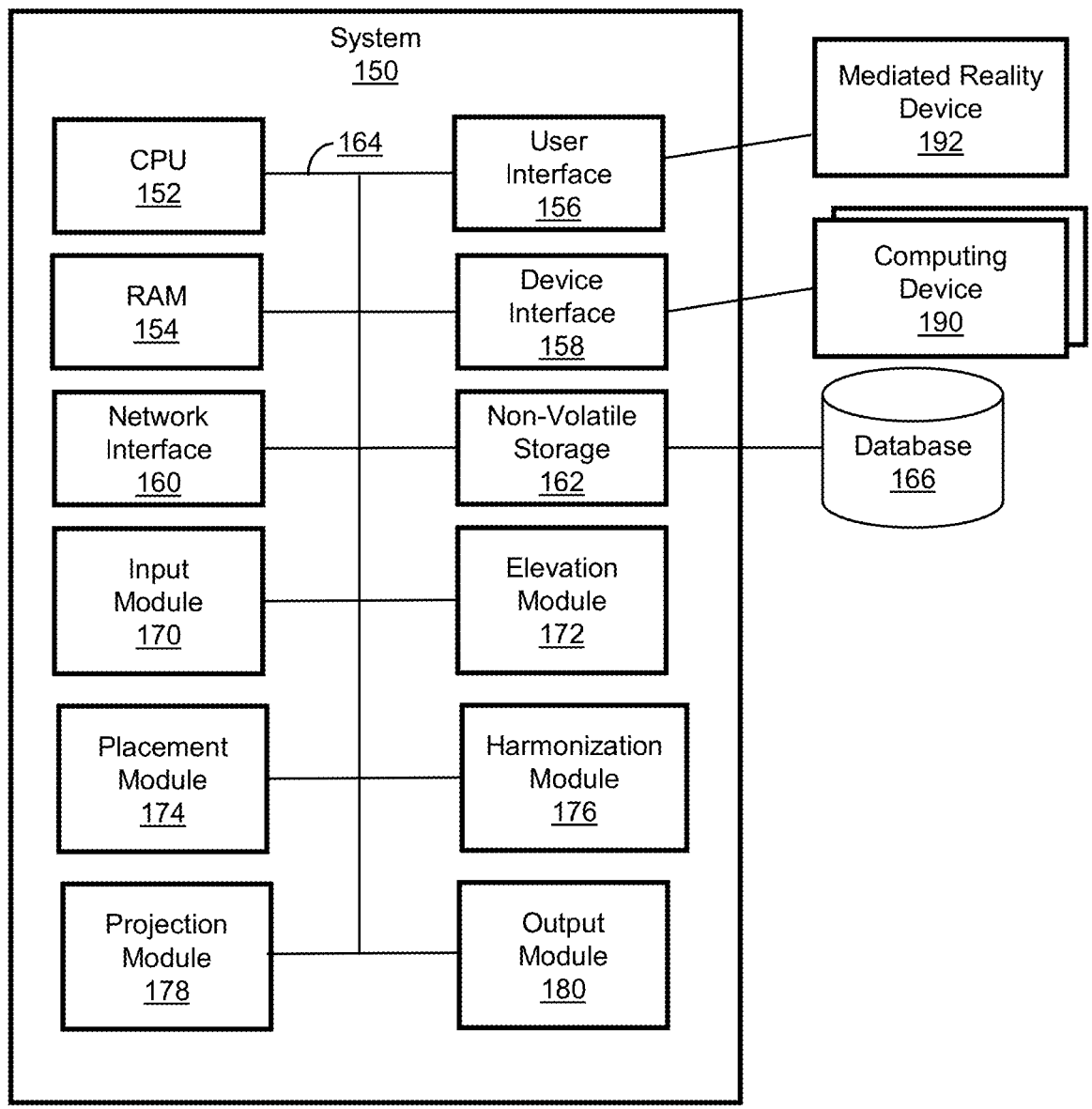
FIG. 1 illustrates a diagram of a system for harmonization of vertical projections for displaying of geospatial object data in mediated reality, according to an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine, or device exemplified herein that executes instructions may include or otherwise have access to computer-readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer-readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application, or module herein described may be implemented using computer readable/executable instructions that may be stored or otherwise held by such computer-readable media and executed by the one or more processors.

Figure 3:
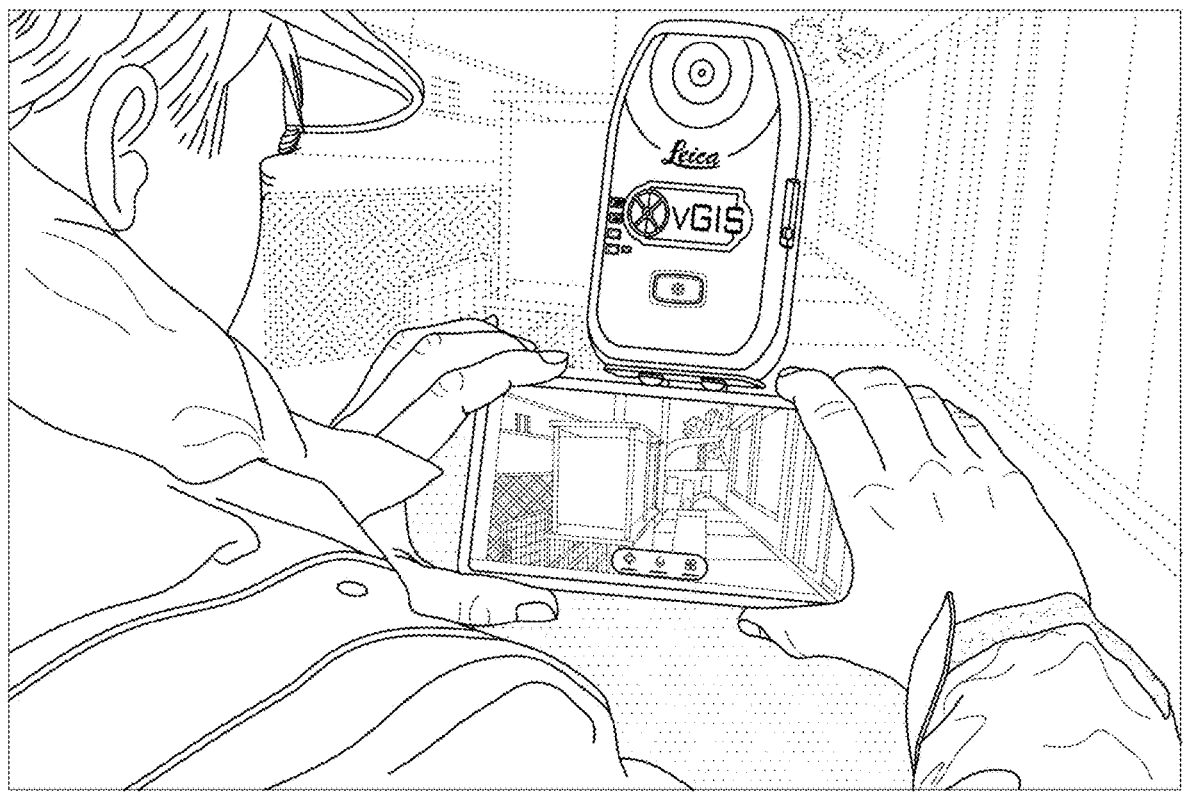
FIG. 3 illustrates an example of a user using a high-accuracy mediated reality (MR) application on their smartphone to visualize geospatial objects around the user via representation of the geospatial objects as MR visuals.

As illustrated in the example of FIG. 3, high-accuracy Augmented Reality (AR) applications have been used to drastically enhance the fields of construction, municipal work and other areas. High-accuracy Mediated Reality (MR) application use geospatial object data that is visualized around a user via representation as MR visuals. This representation creates an illusion that the onscreen visuals match position, elevation, rotation, and scale of the geospatial objects they represent. Additional techniques, such as occlusions, are used to increase the descriptiveness and realism of the MR visuals.

Displaying geospatial object data in MR generally uses at least two key components: knowledge of geospatial object data location (latitude/longitude, northings/easting, and the like) and knowledge of the user's, or the MR visualization device's, location and viewing direction. The visualization device can then place objects in space relative to the user's viewpoint.

In typical cases, high-accuracy MR relies on a combination of global navigation satellite system (GNSS) and real-time kinematic positioning (RTK), a surveying prism, or other types of positioning tracking approaches.

Figure 4:
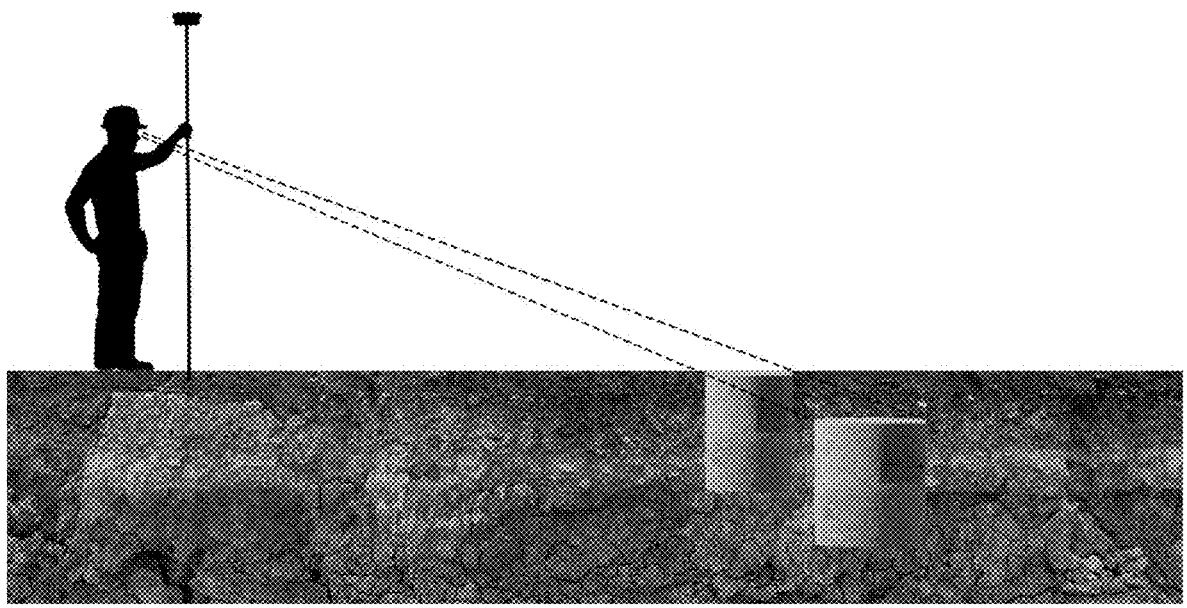
FIG. 4 illustrates a diagram of an example of vertical placement of geospatial objects in MR affecting perception of horizontal position.

In addition to knowing horizontal position, working with three-dimensional (3D) geospatial objects in MR generally requires knowing the object's vertical position; for example, an absolute elevation or elevation relative to the ground level. Vertical placement of the objects in MR often affects perception of their horizontal position; for example, as illustrated in the example of FIG. 4, objects that are placed lower may appear closer in MR, and objects that are higher may appear farther.

Generally, there are two main types of geospatial object data placement: (1) a first is relative or offset from a surface or perceived surface (for example, municipal water and sewer pipes are usually documented with depth to the road surface), and (2) a second is absolute elevation (for example, objects have absolute elevation relative to the sea level, ellipsoid, geoid, or the like). Displaying these two geospatial object data placement datasets in MR generally requires different techniques.

Figure 5:
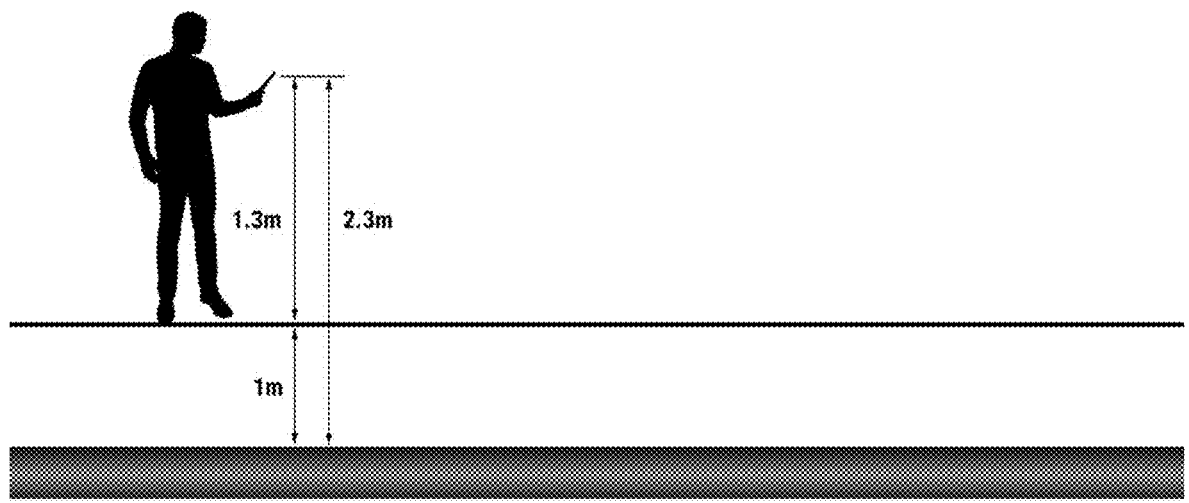
FIG. 5 illustrates a diagram of an example of vertical placement of a pipe located below ground.

For the first type of geospatial object data placement, geospatial objects (also referred to as "geospatial objects") offset from the surface can be placed relative to a perceived surface. For example, if the MR viewpoint is 1.3 meters (m) above ground level, and the object is 1 m below the ground level, the object will be displayed 2.3 m below the MR viewpoint (as illustrated in the example of FIG. 5). This technique is often used in industrial settings. In most cases, MR devices can use sensors or machine learning to detect the surface of the ground (or use a pre-defined elevation to the ground) and project visuals relative to the ground.

Figure 6:
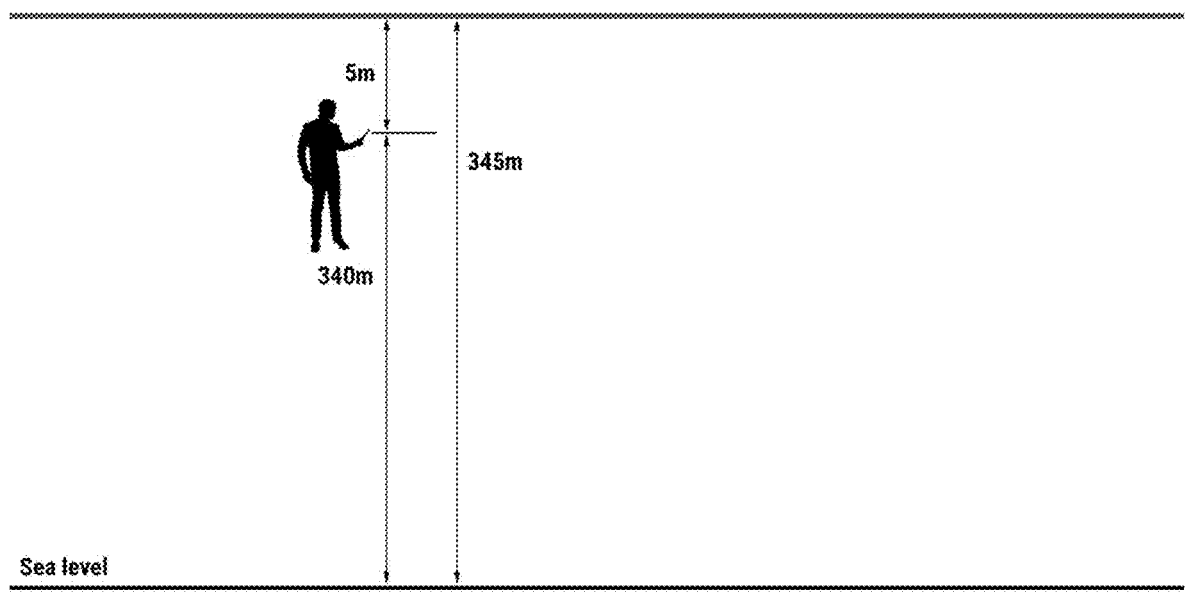
FIG. 6 illustrates a diagram of an example of determining geospatial object placement relative to a user and relative to a fixed elevation reference (in this case, sea level)

For the second type of geospatial object data placement, geospatial objects with absolute elevation generally require a different approach. As their elevation is recorded relative to an absolute point, the elevation of the MR viewpoint relative to the same absolute point needs to be known in order to project the MR visuals accurately. For this type, the ground level generally does not affect MR visuals because, unlike with relative projections, it is known where to display visuals based on absolute elevation of both the MR viewpoint and the geospatial object. For example, if a geospatial object has an elevation of 345 m above sea level, and the MR viewpoint elevation is 340 m, the MR representation of the geospatial object will be displayed 5 m above the MR viewpoint; as illustrated in the example of FIG. 6.

However, vertical placement can get more complex when working with uneven terrains. In some cases, projecting data over shorter (for example, under 20 m) distances and in a relatively flat environment (for example, parking lot, industrial building, or office with even floors) may be performed without incorporating any specifics of the surrounding terrain. However, outdoors or in highly uneven settings (for example, stair cases or multileveled floors), projecting data relative to a virtual flat plane will generally cause noticeable visual distortion. In such situations, a Digital Terrain Model (DTM) can be used to minimize or eliminate such distortions; as exemplified in FIG. 7.

The specifics of the terrain will generally not affect visual placement of geospatial objects with absolute elevation if the MR viewpoint also uses absolute elevation.

Figure 8:
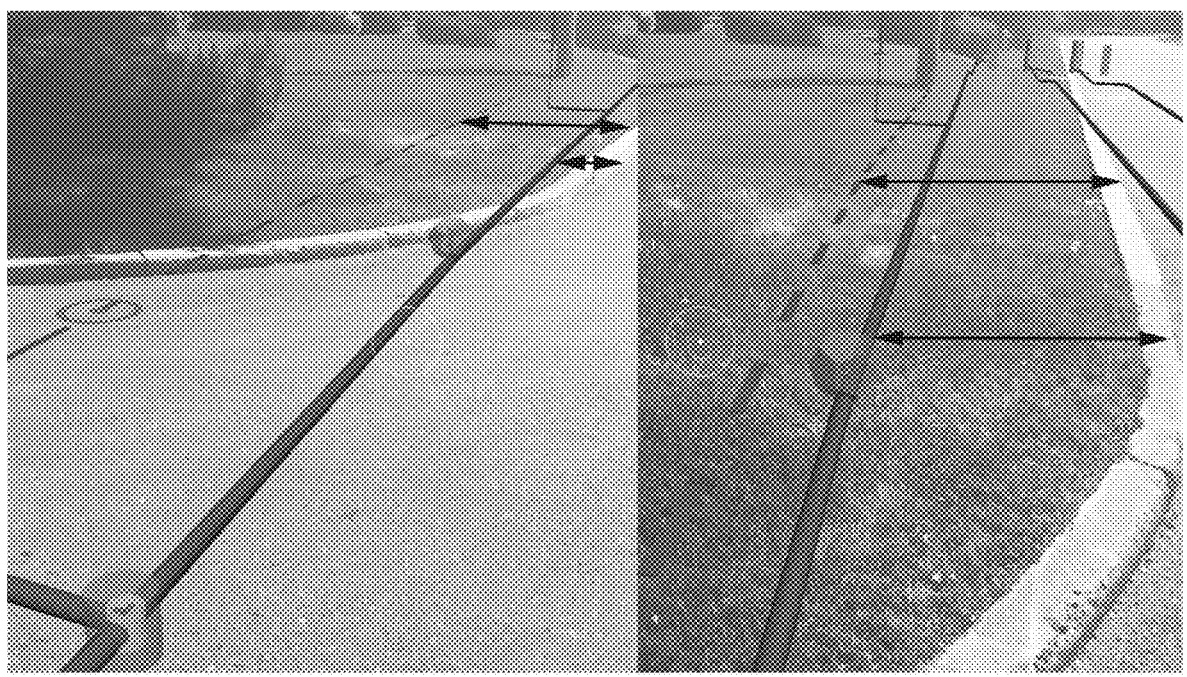
FIG. 8 illustrates exemplary screenshots showing that as a user moves, a displayed underground pipe appears to shift away from the curb due to the parallax effect and a dotted line surface projection appears in correct position.

3D visuals are generally subjected to the parallax effect. The parallax effect generally has little impact on MR visuals of objects displayed at the ground level or above ground; as they will match the visual shifts of objects in the physical world. However, the parallax effect can negatively impact MR visuals of subsurface geospatial objects, as they can appear to float in MR. To help the user deal with the parallax effect, MR visuals may incorporate visual aids; for example, surface projections for subsurface data or dipsticks visually connecting subsurface objects to the surface. FIG. 8 illustrates an example showing that as a user moves, the displayed pipe, that is at a depth underground, appears to shift away from the curb due to the parallax effect; but the dotted line surface projection appears as if it stays in place.

Proper placement and visualization of geospatial objects becomes substantially more complicated when absolute and relative elevation systems are required to be combined. For example:

Visuals of geospatial objects with absolute elevation need to be projected for the user whose absolute elevation cannot be detected (or whose absolute elevation is inaccurate);

Visuals of geospatial objects offset from the ground level are displayed to the user who has absolute elevation.

A mix of geospatial objects with absolute and relative elevation need to be displayed in the same MR view.

Displaying visual aids for geospatial objects with absolute elevation where digital terrain has inaccurate or incorrect elevation.

In an example, if the geospatial object has an associated absolute elevation, but the user's elevation cannot be detected, then there is no reliable way to project the visuals relative to the user as the user can be anywhere in the vertical space. Assuming the user's elevation can result in substantial visual distortions. For example, if a geospatial object has elevation of 123 m above the sea level, and user's elevation is undetected and assumed to be the same as the geospatial object (123 m), then the geospatial object will be displayed at the eye-level relative to the user. If that geospatial object is a powerline cable, it will therefore be too low, while if the geospatial object is sewer line, it will be too high. In both cases (too high or too low), the visuals will appear highly distorted to the user.

In another example, if the user has a detected absolute elevation, but the data does not have an associated absolute elevation, it can result in substantially incorrect visuals. Particularly, projecting visuals relative to the flat plane will not work for non-flat landscapes. However, applying a DTM to correct visuals may also result in distortions because the DTM can have inaccuracies, approximations, and vertical shifts. For example, if the DTM is 2 m too low relative to the user, all geospatial objects projected relative to the DTM will be 2 m too low.

In another example, if a dataset combines some geospatial objects with absolute elevation and some geospatial objects with relative offsets, accurately displaying both types of geospatial objects to the user will be substantially difficult. Without a unifying element, objects will appear in two different places vertically.

It is critically important for high-precision applications, such as engineering work, that the accuracy of MR visuals must remain very high (for example, within centimeters). Vertical mismatches may render MR visuals highly unreliable to the point of being useless for the intended application. These and other issues pertaining to displaying geospatial object data in MR have been substantial roadblocks for adopting MR in outdoor environments. Some of these challenges can be overcome by manual data preparation that harmonizes the data into a single model around a single projection system, preprocessing of data using specific rules, or other approaches. These manual or semi-manual preprocessing steps require trained technicians to combine models using desktop or cloud software. In doing so, technicians rely on their personal knowledge of data conversion techniques, survey information, and predefined set of conversion rules. Often, when creating such a model, the technician will use their personal discretion to place objects correctly relative to one another. The resulting model is a rigid arrangement of elements where all model components are placed in a fixed place relative to a central point of origin, or to each other or control point(s).

Figure 9:
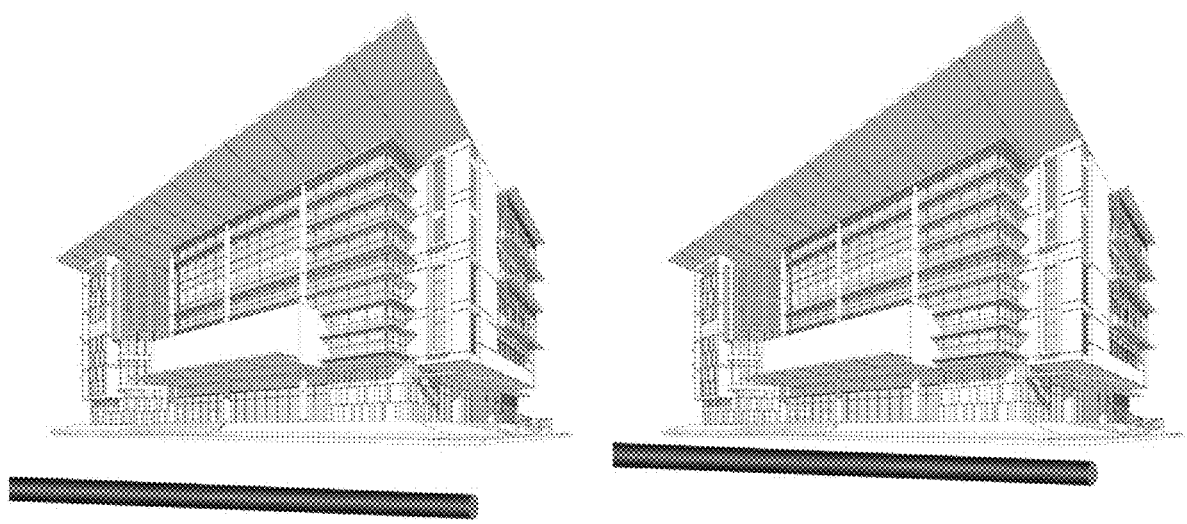
FIG. 9 illustrates an example of an underground pipe appearing too high or too low due to an inability to validate ground level relative to a building.

The situation complicates further when source data contains information that is projected relative to the ground surface. Since the ground level is not an absolute value, the results rely on the discretion of the person performing data harmonization. In many instances, it is difficult, if not impossible, for a technician to know the ground level at a job site, and the resulting models may contain elements that are too high or too low; as illustrated in the example of FIG. 9 where manual pipe placement relative to the building might be too high or two low as there is no effective way to validate where the ground level is relative to the building.

The above approaches are generally not suitable for environments with dynamic data; for example, where the source data changes frequently or where trained technicians are unavailable. In dynamic environments, these preparatory steps required for data harmonization may render such solutions impractical due to the time and effort required to adjust data manually. Additionally, the preprocessed model can quickly become outdated as objects or terrain are moved or changed. Outdated models communicate inaccurate information to the user, which may lead to errors, work delays, and personal safety issues. Otherwise, without the preprocessing, the user is restricted to working with a single dataset where all dataset elements share the same vertical and horizontal projection system.

The above problems with harmonization of data may result in a model that doesn't fully align with the physical world in the vertical dimension. In such cases, although horizontal alignment might be accurate, vertical misalignment within the model may discourage the user from deploying MR, as they will perceive data displayed in MR as inaccurate.

The present embodiments advantageously allow for harmonizing of dynamic datasets and increasing the visual accuracy of MR projections; thus, addressing critical roadblocks to deploying high-accuracy MR for geospatial object display.

Turning to FIG. 1, a system 150 for harmonization of vertical projections for displaying of geospatial object data in mediated reality (MR) is shown, according to an embodiment. In this embodiment, the system 150 is run on a local computing device (for example, a mobile device). In further embodiments, the system 150 can be run on any other computing device; for example, a server, a dedicated price of hardware, a laptop computer, a smartphone, a tablet, a mixed reality device (for example, a Microsoft™ HoloLens™), true holographic systems, purpose-built hardware, or the like. In some embodiments, the components of the system 150 are stored by and executed on a single computing device. In other embodiments, the components of the system 150 are distributed among two or more computer systems that may be locally or remotely distributed; for example, using cloud-computing resources.

FIG. 1 shows various physical and logical components of an embodiment of the system 150. As shown, the system 150 has a number of physical and logical components, including a central processing unit ("CPU") 152 (comprising one or more processors), random access memory ("RAM") 154, a user interface 156, a device interface 158, a network interface 160, non-volatile storage 162, and a local bus 164 enabling CPU 152 to communicate with the other components. CPU 152 executes an operating system, and various modules, as described below in greater detail. RAM 154 provides relatively responsive volatile storage to CPU 152. The user interface 156 enables an administrator or user to provide input via an input device, for example a mouse or a touchscreen. The user interface 156 also outputs information to output devices; for example, a mediated reality device 192, a display or multiple displays, a holographic visualization unit, and the like. The mediated reality device 192 can include any device suitable for displaying augmented or mixed reality visuals; for example, smartphones, tablets, holographic goggles, purpose-built hardware, or other devices. The mediated reality device 192 may include other output sources, such as speakers. In some cases, the system 150 can be collocated or part of the mediated reality device 192. In some cases, the user interface 156 can have the input device and the output device be the same device (for example, via a touchscreen).

The mediated reality device 192 can display a mediated reality 'live' view (such as a video stream or a sequential stream of captured images) received from a camera. This live view is oriented in a particular determined direction. In embodiments using holographic devices, in some cases, receiving the 'live view' can be omitted because the visual representation itself is displayed in the 'physical space'.

Non-volatile storage 162 stores the operating system and programs, including computer-executable instructions for implementing the operating system and modules, as well as any data used by these services. Additional stored data can be stored in a database 166. During operation of the system 150, the operating system, the modules, and the related data may be retrieved from the non-volatile storage 162 and placed in RAM 154 to facilitate execution.

In an embodiment, the system 150 further includes a number of functional modules to be executed on the one or more processors 152; for example, an input module 170, an elevation module 172, a placement module 174, a harmonization module 176, a projection module 178, and an output module 180. In further cases, the functions of the modules can be combined or executed by other modules.

Figure 2:
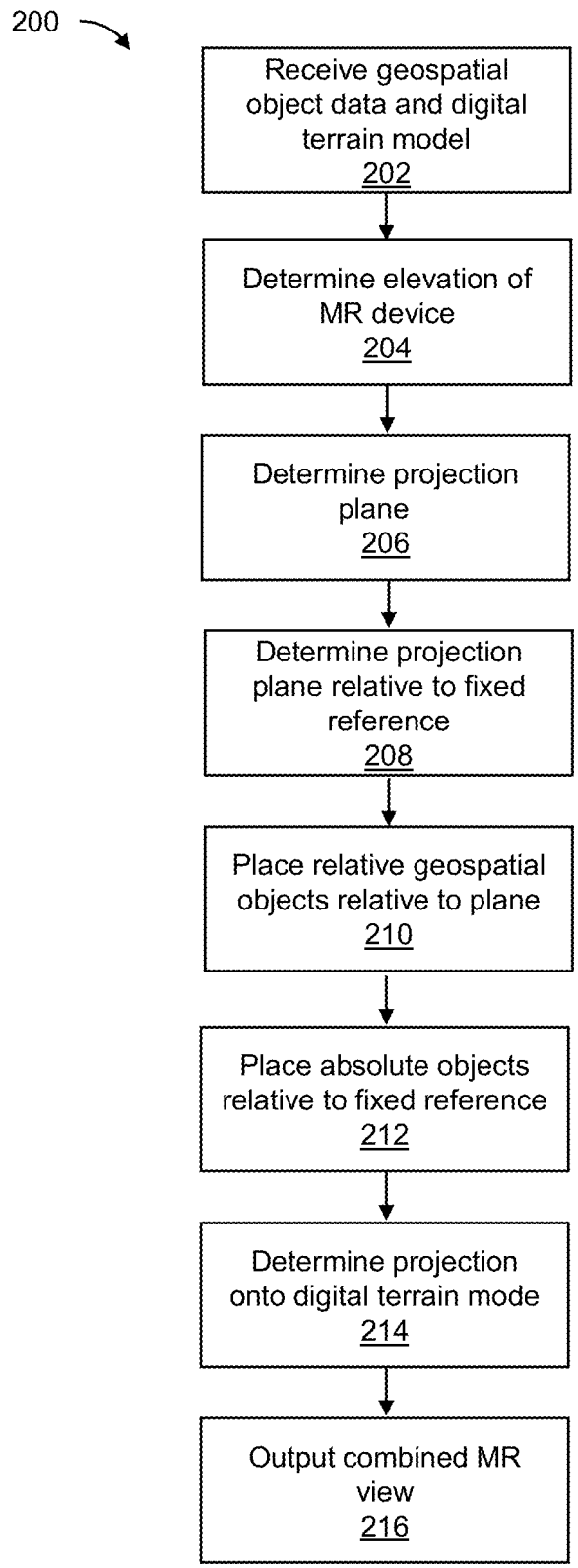
FIG. 2 illustrates a flow diagram of a method for harmonization of vertical projections for displaying of geospatial object data in mediated reality, according to an embodiment.

Turning to FIG. 2, a flowchart of a method 200 for harmonization of vertical projections for displaying of geospatial object data in MR is shown, according to an embodiment. The geospatial object data having objects with associated absolute vertical dimensions and objects with associated relative vertical positions. At block 202, the input module 170 receives the geospatial object data to be displayed, such as from the database 166 or the network interface 160 (such as communicated over the Internet or other network). The input module 170 also receives the digital terrain model (DTM) from the database 166 or the network interface 160 (such as communicated over the Internet or other network).

Generally, DTM includes surface contours and can be used to return an elevation for a specific location. In this way, a query with latitude/longitude can be provided to the DTM and an elevation can be returned or the elevation can be detected based on the DTM shape.

At block 204, the elevation module 172 determines an absolute elevation of the MR device relative to a fixed elevation reference. In some cases, the elevation of the MR device can be determined using GNSS and/or RTK, or a total station survey instrument, a terrestrial positioning system, or other survey instrument. Relative to the absolute elevation, placement of objects that also have absolute elevation, such as fixed structures, can be determined. In some cases, in the absence of reliable absolute elevation data, the DTM can be used as a reference for the MR device elevation In such cases, where the absolute elevation is not available or cannot be measured, the absolute elevation can be approximated using a predefined value relative to the DTM (such as 2 m above the DTM), or by surface scanning the ground to detect the MR Viewpoint elevation above the ground, and thus, the DTM; because the DTM has a known absolute elevation relative to the fixed elevation reference.

Figure 7:
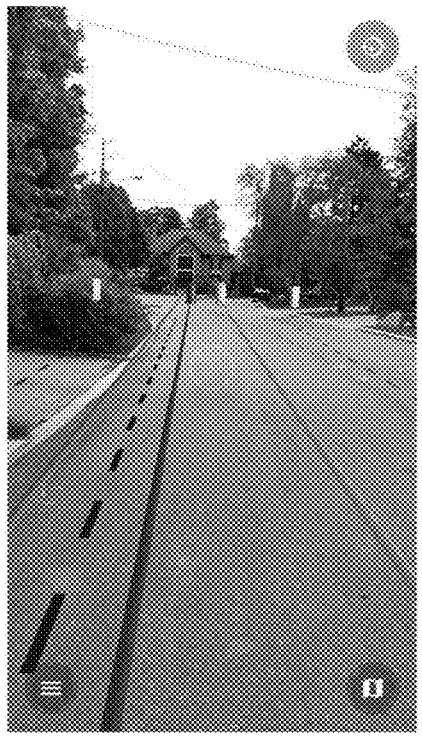
FIG. 7 illustrates exemplary screenshots with digital terrain model (DTM) corrections disabled and enabled.
Figure 7:
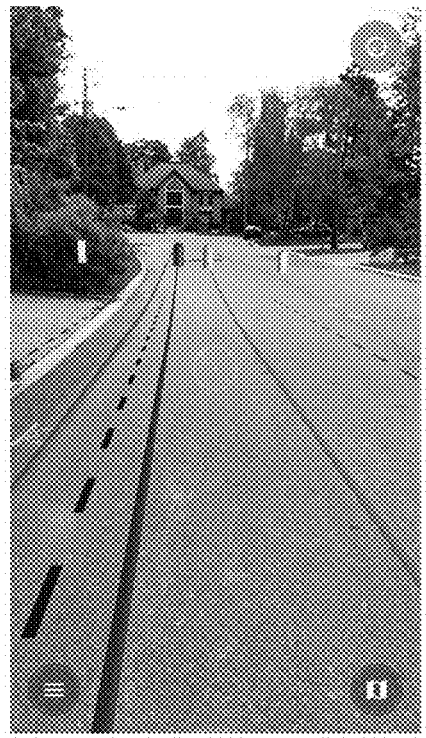

When projecting representations of geospatial objects close to the user (for example, closer than 15 m) and projected on relatively flat terrains, it may be safe to assume the ground is flat around the user. Any visual distortion due to the elevation changes may be negligible. Additionally, over short distances (for example, up to 5 m to 10 m) some MR devices can perform accurate ground scans to create localized digital terrain models, which can help improve visuals over uneven terrains. However, neither the flat approximation, nor the local scans, are generally helpful when displaying objects father away (for example, 15 m or more) or in situations with rapid and complex elevation changes (e.g., staircases). At such distances, terrain elevation changes can introduce significant visual distortions. To compensate for elevation changes, a digital terrain model (DTM) can be introduced. The DTM can be used to offset objects vertically based on the elevation information in the DTM, as illustrated in the example of FIG. 7.

Figure 10:
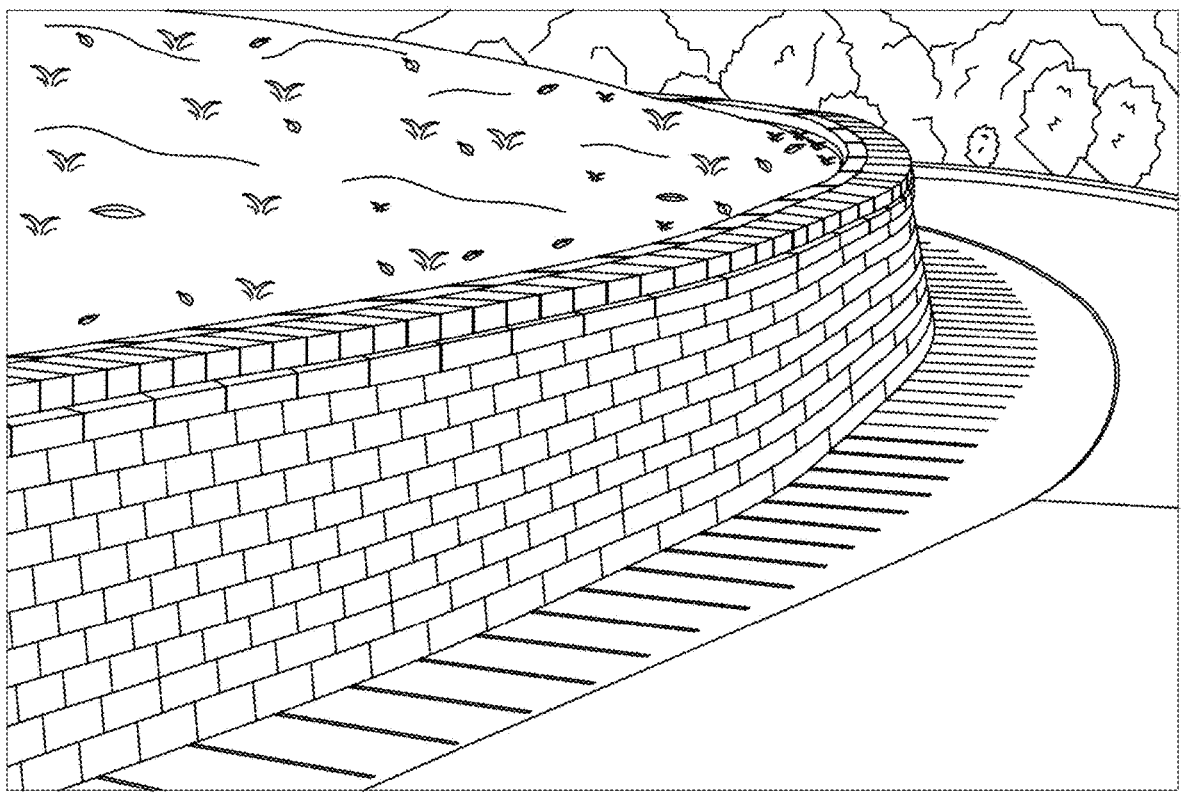
FIG. 10 illustrates an example photograph of a levelled sidewalk beside a raised lawn.

Even the most accurate DTM may have deviations from surfaces actually in the physical space due to, for example, scan accuracy, approximation, tiling, and other factors. Even if the DTM is set perfectly levelled with the physical ground at some point, as the user begins to move away from that point, it is possible that the vertical "drift" may occur. For example, if the user moved over a flat, levelled sidewalk with a raised lawn beside it (as shown in the example of FIG. 10), the DTM may be based on an average elevation of the sidewalk. Accordingly, the DTM will be too high when standing on the sidewalk and too low when standing on the lawn, which will impact MR visuals. Thus, if the user started their MR session on the lawn with objects projected at the ground level of the lawn, by stepping down to the sidewalk, the same objects will appear hovering above the sidewalk, much higher than they should be, instead of on the surface of the sidewalk.

To negate this vertical drift, the elevation module 172 can define a set elevation of the MR viewpoint relative to the ground such that the displayed geospatial objects move up and down with the camera movements. In other cases, the elevation module 172 can perform periodic or intermittent scans of the surfaces around the MR device to detect the ground level and then adjust the DTM elevation to bring it in alignment with the ground level. Using surface scanning, the elevation module 172 can project the data with elevation defined relative to the surface.

At block 206, the elevation module 172 determines an elevation of the MR device relative to physical ground that is in proximity to the MR device. In a particular case, surface scanning can be used to determine the elevation relative to the ground or a predefined distance can be used. To create an illusion of a geospatial object resting on the ground or other surface, the elevation module 172 can use the predefined distance to the surface or perform the surface scanning to estimate the vertical position of the ground level or the vertical position of other surfaces. The surface scanning can be performed on-time, periodically, or intermittently. This elevation information can be used to scale, place and track digital representations of the geospatial objects in MR space. For surface scanning, in some cases, built-in functions in augmented reality frameworks can be used; for example ARCore, ARKit, MRTK have built-in application programming interface tools that can be used to scan and detect the ground plane.

The elevation module 172 determines a projection plane by projecting the determined elevation from surface scanning onto the DTM. In most cases, the surface in the DTM can be used as the projection plane. The DTM can be matched to the ground surface. In some cases, where a DTM is not used or not available, the elevation module 172 can use a flat plane as a projection plane and match the flat plane to the ground surface.

To determine the projection plane, the elevation module 172 can detect the ground surface by either scanning the surface around the MR viewpoint or by using a predefined value for the distance from the MR viewpoint to the ground. Using the projection plane and elements linked to the projection plane, the elevation module 172 matches the projection plane to the ground surface around the user. In some cases, the projection plane determination can be repeated periodically or intermittently to maintain alignment between the physical ground and the projection plane around the MR viewpoint.

Generally, the projection plane is an approximation of the terrain around the MR device that helps with projecting objects that should be offset from the surface or drawn on top of the physical ground (like markings painted on the ground). The projection plane is a virtual plane used to project surface lines (such as visual aids, as described herein) and determine relative elevation. In this way, the elevation module 172 uses the projection plane to place surface lines on and offset relative data from. The projection plane can be the DTM surface or a flat surface (for example, if the DTM is not available or not used due to potential inaccuracies).

The projection plane may be the same as the DTM but it can also differ because it can be a combination of local ground scans around the user, flat surfaces where DTM is unavailable or disabled, and the DTM itself. This combination advantageously provides the most accurate surface to project geospatial objects and surface lines on, and to be used to offset relative data geospatial objects from.

Thus, the projection plane can be used to accurately match to the ground surface. For example, if the surface scan indicates that the MR device is positioned 1.45 m above the ground, the elevation module 172 can adjust the vertical placement of the MR viewpoint to 1.45 m above the projection plane. So everything that is positioned with respect to the projection plane will appear as if it is positioned accurately on the ground.

At block 208, the harmonization module 176 determines positioning of the projection plane relative to the fixed elevation reference. In most cases, the DTM has associated data corresponding to the elevation of each portion of the DTM relative to the fixed elevation reference (such as relative to sea level or an ellipsoid).

In some cases, the projection plane can be harmonized with the fixed elevation reference by:

If the absolute elevation of the MR device is known, then the projection plane can be positioned at an elevation above the fixed elevation reference. This elevation is the elevation of the MR device determined by the elevation module 172 at block 204 subtracted by the elevation of the MR device above the physical ground determined by the elevation module 172 at block 206.

If the absolute elevation of the MR device is not known, then the projection plane can be positioned at an elevation above the fixed elevation reference using DTM values or a predefined elevation value. In the first case, the projection plane is determined using the DTM and adding or subtracting a predefined offset. The elevation of the MR device is determined by the elevation module 172 using the projection plane and the elevation of the MR device relative to the projection plane.

At block 210, the placement module 174 positions the geospatial objects with relative vertical positioning data in the mediated reality display relative to the determined projection plane. Since the projection plane has been determined, and the elevation of the projection plane relative to the fixed elevation reference is known, the elevation points along the plane are known by the placement module 174. The placement module 174 thus determines an elevation for geospatial objects with relative elevations by determining the objects' elevation relative to the elevation points; which can be determined as the projection plane elevation plus-or-minus the elevation of the geospatial object relative to the projection plane.

At block 212, since the placement module 174 has determined the absolute elevation of the MR device, the placement module 174 positions the geospatial objects with absolute vertical positioning data in the mediated reality display relative to the absolute elevation reference. As the elevation of the MR device is known, as determined by the elevation module 172 at block 204, and the absolute elevation of the objects are known, the geospatial objects with absolute vertical positioning data can be positioned with respect to the MR device accordingly.

Generally, placing geospatial object data that has absolute elevation in MR is usually performed by identifying the absolute position of the user. Typically, a high-accuracy positioning device, such as GNSS or a total station, determines where the user is horizontally and vertically, and the geospatial object data placement relative to the user is then determined (as exemplified in FIG. 6). However, sometimes the user's location and viewing direction can be established, but the absolute elevation cannot. For example, in situations where alternative positioning techniques, such as markers or visual landmarks, are used. Such scenarios present a significant problem for displaying MR visuals; if the user's elevation is unknown, where does the system place the displayed objects relative to?

The placement module 174 can overcome this challenge by either predefining a user elevation through user inputs or predetermined settings, estimating elevation based on a model (for example, using a bounding box, average elevation of all elements, or the like), or by detecting the system's elevation based on a DTM.

Figure 11:
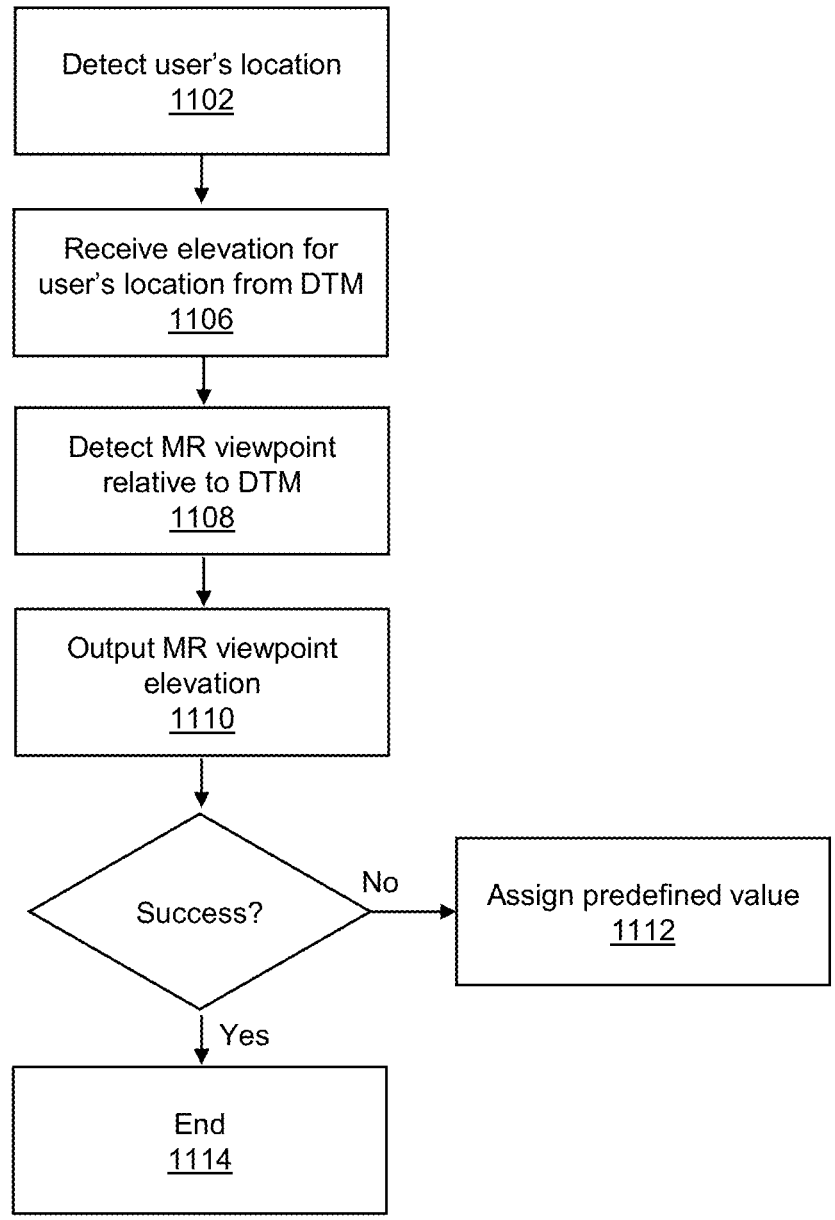
FIG. 11 illustrates a flowchart of an example of determining absolute elevation, in accordance with an embodiment.

FIG. 11 illustrates a flowchart of an example of determining absolute elevation. At block 1102, the user's vertical position is determined. At block 1106, the user's vertical position is determined with respect to the DTM. At block 1108, the MR device's viewpoint is determined relative to the DTM by scanning the ground level to detect the MR viewpoint height above the ground, or a fixed predefined value is used (for example, using a fixed surveying pole to determine such value). At block 1110, the MR viewpoint's elevation is used and the technique ends at 1114. If the elevation determination is not successful, the predefined value is used at block 1112. In some cases, a check can be performed to determine if the elevation determination using the DTM was successful; such as checking whether a valid elevation number was returned from the DTM. If an error is suspected, the predefined elevation value can be used instead.

In some cases, where absolute elevation of the user cannot be detected using the DTM method, geospatial objects can be visualized at the incorrect elevation relative to the MR viewpoint as a fallback. In some cases, DTM information for a given area might not be accurate. Thus, the placement module 174 can introduce a DTM offset to shift the DTM surface up or down by a specific value to eliminate the inaccuracies.

At block 214, in some cases, the projection module 178 determines a projection of at least one of the geospatial objects onto the digital terrain model to be displayed on the display of the MR device. Generally, objects in 3D space are subject to a parallax effect, which makes understanding the position of 3D objects difficult. In some cases, placing visual aids that communicate an object's position relative to the ground level or surrounding physical objects may help negate the confusing visuals due to the parallax effect. The surface plane, described herein, which is based on the vertical position of the physical ground, can be used to project outlines, centerlines, and/or other markings for sub-surface or above-ground geospatial objects. These outlines, centerlines, and/or other markings can be used to advantageously establish visual anchors and points of visual reference. In the example of FIG. 8, dashed lines projected on the DTM can be used to negate the parallax effect and provide clarity about where the underlying pipe is located relative to the ground surface.

At block 216, the output module 180 outputs the combined MR view showing both the geospatial objects with associated absolute vertical dimensions and the geospatial objects with associated relative vertical positions. In some cases, the output module 180 also outputs the projections of the geospatial objects.

In some cases, the absolute elevation of the user's device cannot be accurately detected. In such cases, the elevation module 172 can generate the projection plane with relative elevation by retrieving the DTM to identify the elevation of the ground surface. If the DTM is not available or elevation data is inaccessible, the elevation module 172 can retrieve and/or use a predefined elevation. The DTM can be used to increate projection accuracy. The elevation module 172 uses the DTM surface as a projection plane. If the DTM is not available or elevation data is inaccessible, the elevation module 172 can use a flat plane as the projection plane and/or can incorporate local surface scans in constructing a more accurate projection plane. The placement module 174 places the geospatial objects with relative elevation data in virtual space using the projection plane. The elevation module 172 detects the ground surface by either scanning the surface around the MR viewpoint or using a predefined value, or user inputted value, for the distance from the MR viewpoint to the ground. The projection plane can be matched to the ground surface around the user. This matching can be repeated periodically or intermittently to maintain alignment between the physical ground and the projection plane of the MR viewpoint. For geospatial objects with absolute elevation, the placement module 174 can use the elevation of the ground level and the elevation of the MR viewpoint above the ground to places these geospatial objects in virtual space. In some cases, a fixed or dynamic DTM offset value can be applied to address inaccuracies in the DTM model.

Figure 12:
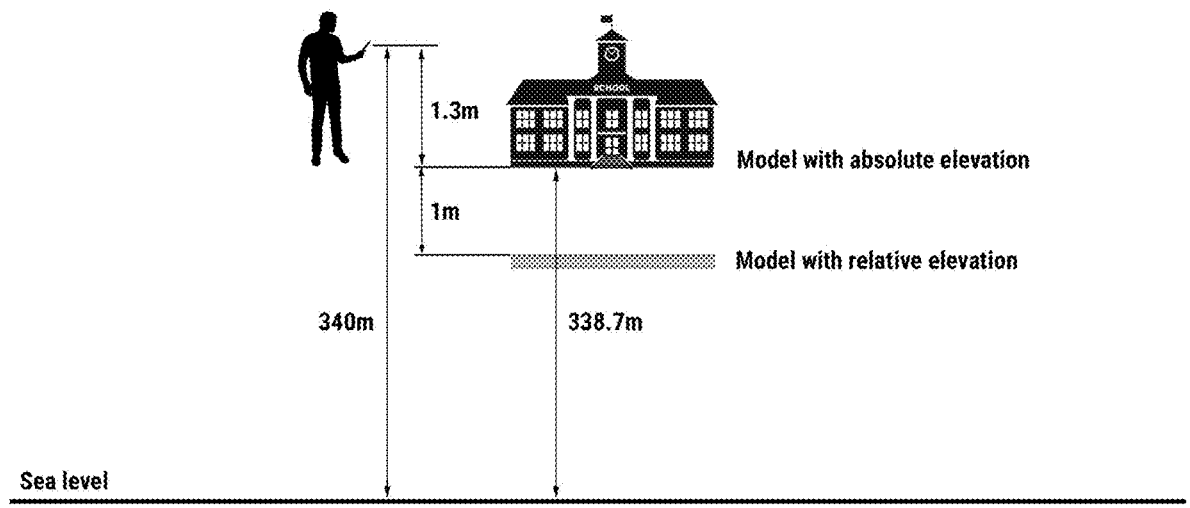
FIG. 12 illustrates a diagrammatic example of harmonizing absolute and relative geospatial object datasets.

FIG. 12 illustrates a diagrammatic example of harmonizing absolute and relative geospatial object datasets. In this example, the MR viewpoint elevation is 340 m, a structure (a school) has its base at 438.7 m above sea level, and a geospatial object (a pipe) has a depth of 1 m relative to the ground. Using the method 200, the system 150 will display the representation of the school with its base at 1.3 m below the MR viewpoint (340 m-438.7 m). The system 150 scans the ground and detects the ground surface at 1.3 m below the MR viewpoint. The system then determines that the pipe is to be displayed at 2.3 m relative to the MR viewpoint (1.3 m+1 m). In some cases, based on the scan results (1.3 m) and the DTM information (438.7 m), the system was able to determine the MR viewpoint's elevation at 340 m (1.3+438.7 m). In such cases, the model of the school will be projected in VR space with its base at 1.3 m below the MR viewpoint (340 m-438.7 m).

Although the foregoing has been described with reference to certain specific embodiments, various modifications thereto will be apparent to those skilled in the art without departing from the spirit and scope of the invention as outlined in the appended claims. The entire disclosures of all references recited above are incorporated herein by reference.

The invention claimed is:

1. A computer-executable method for harmonization of vertical projections for displaying of geospatial object data on a mediated reality (MR) device, the geospatial object data comprising geospatial objects with relative vertical positioning data that is relative to other geospatial objects and geospatial objects with absolute vertical positioning data that is relative to a fixed elevation reference, the method comprising:

receiving the geospatial object data;

determining an absolute elevation of the MR device relative to a fixed elevation reference;

determining an elevation of the MR device relative to physical ground that is in proximity to the MR device;

determining a projection plane using the determined elevation of the MR device;

determining positioning of the projection plane relative to the fixed elevation reference;

determining positioning of the geospatial objects with relative vertical positioning data in the mediated reality display relative to the determined projection plane;

determining positioning of the geospatial objects with absolute vertical positioning data in the mediated reality display relative to the fixed elevation reference; and outputting the positioned geospatial objects with relative vertical positioning data and the positioned geospatial objects with absolute vertical positioning data to the display of the MR device.

2. The method of claim 1, further comprising receiving a digital terrain model, and wherein determining the projection plane comprises using the surface of the digital terrain model in the determination of the projection plane.

3. The method of claim 1, wherein determining the elevation of the MR device relative to the physical ground comprises either performing surface scanning or using a predefined value.

4. The method of claim 1, wherein if the elevation of the digital terrain model is not available, using a predefined value as the elevation of the projection plane.

5. The method of claim 1, wherein determining the projection plane comprises coinciding the projection plane with a flat plane at the physical ground surface in proximity to a location of determined elevation of the MR device.

6. The method of claim 1, wherein the absolute elevation associated with the MR device is determined using at least one of global navigation satellite systems (GNSS), real-time kinematics (RTK), and a surveying instrument.

7. The method of claim 2, wherein the absolute elevation associated with the MR device is determined using an absolute elevation of the digital terrain model in addition to the elevation of the MR device relative to physical ground.

8. The method of claim 1, wherein determining the elevation of the MR device relative to physical ground that is in proximity to the MR device is performed periodically or intermittently.

9. The method of claim 1, wherein the digital terrain model comprises a predetermined offset to shift the digital terrain model vertically upwards or downwards to align the digital terrain model elevation with the physical ground elevation.

10. The method of claim 1, further comprising displaying a projection of at least one of the geospatial objects onto the digital terrain model on the display of the MR device.

11. A system for harmonization of vertical projections for displaying of geospatial object data on a mediated reality (MR) device, the geospatial object data comprising geospatial objects with relative vertical positioning data and geospatial objects with absolute vertical positioning data, the system comprising one or more processors in communication with a data storage to execute:

an input module to receive the geospatial object data;

an elevation module to determine an absolute elevation of the MR device relative to a fixed elevation reference, to determine an elevation of the MR device relative to physical ground that is in proximity to the MR device, and to determine a projection plane using the determined elevation of the MR device;

a harmonization module to determine positioning of the projection plane relative to the fixed elevation reference;

a placement module to determine positioning of the geospatial objects with relative vertical positioning data in the mediated reality display relative to the determined projection plane and to determine positioning of the geospatial objects with absolute vertical positioning data in the mediated reality display relative to the fixed elevation reference; and an output device to output the positioned geospatial objects with relative vertical positioning data and the positioned geospatial objects with absolute vertical positioning data to the display of the MR device.

12. The system of claim 11, wherein the input module further receives a digital terrain model, and wherein determining the projection plane comprises using the surface of the digital terrain model in the determination of the projection plane.

13. The system of claim 11, wherein determining the elevation of the MR device relative to the physical ground comprises either performing surface scanning or using a predefined value.

14. The system of claim 11, wherein if the elevation of the digital terrain model is not available, using a predefined value as the elevation of the projection plane.

15. The system of claim 11, wherein the projection plane coincides with a flat plane at the physical ground surface in proximity to the MR device.

16. The system of claim 11, wherein the absolute elevation associated with the MR device is determined using at least one of global navigation satellite systems (GNSS), real-time kinematics (RTK), and a surveying instrument.

17. The system of claim 12, wherein the absolute elevation associated with the MR device is determined using an absolute elevation of the digital terrain model in addition to the elevation of the MR device relative to physical ground.

18. The system of claim 11, wherein determining the elevation of the MR device relative to physical ground that is in proximity to the MR device is performed periodically or intermittently.

19. The system of claim 11, wherein the digital terrain model comprises a predetermined offset to shift the digital terrain model vertically upwards or downwards to align the digital terrain model elevation with the physical ground elevation.

20. The system of claim 11, further comprising a projection module to determine a projection of at least one of the geospatial objects onto the digital terrain model to be displayed on the display of the MR device.

* * * * *